United States Patent [19]

Moriyasu et al.

[11] Patent Number: 5,699,512
[45] Date of Patent: Dec. 16, 1997

[54] SOFTWARE ANALYSIS PROTECTION METHOD FOR CHANGING THE SOFTWARE PATTERN ON THE MEMORY OF A USER TERMINAL

[75] Inventors: Kenji Moriyasu, Tokyo; Atsusi Kanai, Kanagawaken; Nobuhisa Miyake; Atsusi Terauchi, both of Tokyo; Hironobu Okuyama, Saitamaken, all of Japan

[73] Assignee: Nippon Telegraph and Telephone Corp., Tokyo, Japan

[21] Appl. No.: 431,305

[22] Filed: Apr. 28, 1995

[30] Foreign Application Priority Data

Apr. 28, 1994 [JP] Japan .................. 6-092134

[51] Int. Cl.⁶ .................................. G06F 11/34
[52] U.S. Cl. ..................... 395/186; 395/187.01
[58] Field of Search ..................... 395/186, 187.01, 395/188.01; 380/3, 4

[56] References Cited

U.S. PATENT DOCUMENTS

5,103,476  4/1992  Waite et al. .................. 380/4
5,222,134  6/1993  Waite et al. .................. 380/4
5,499,295  3/1996  Cooper ........................ 380/23

*Primary Examiner*—Robert W. Beausoliel, Jr.
*Assistant Examiner*—P. Vales
*Attorney, Agent, or Firm*—Banner & Witcoff, Ltd.

[57] ABSTRACT

A software analysis protection method capable of preventing an illegitimate use of a software reliably, by making a software analysis difficult without complicating or enciphering the software itself. Software parts dividing the software to be used at the user terminal are distributedly stored in the user terminal and the center, and the software parts stored in the center are transmitted to the user terminal and loaded into missing parts among the software parts stored in the user terminal on a memory so as to make the software operable at the user terminal. Then, the software as developed on the memory is operated at the user terminal. The software parts are down-loaded from the center to the user terminal such that an arranged pattern of the software as developed on the memory is changed at each time of a use of the software at the user terminal.

19 Claims, 5 Drawing Sheets

1
SOFTWARE ANALYSIS PROTECTION METHOD FOR CHANGING THE SOFTWARE PATTERN ON THE MEMORY OF A USER TERMINAL

BACKGROUND OF THE INVENTION

1. Field of the Invention

The present invention relates to a software analysis protection method for preventing an illegitimate use of a software such as an application program at a user terminal in a system formed by a center and a plurality of user terminals, by protecting the software stored and executed on each user terminal against an illegitimate software analysis at each user terminal.

2. Description of the Background Art

In general, a software such as an application program provided on a user terminal can be subject to an illegitimate use (software analysis/falsification) by a malicious terminal user. The illegitimate use of a software begins with an analysis of the software on a memory or a disk by using tools such as a debugger.

In order to make this software analysis difficult, it is possible to make the software itself complicated. However, the effectiveness of this scheme is a relative factor, and this scheme is inapplicable to a short software, so that this scheme cannot be considered as a completely reliable measure.

It is also possible to encipher the software, but this scheme requires a mechanism for deciphering the software and that deciphering mechanism itself cannot be enciphered, so that by analyzing an output portion of that deciphering mechanism, it is possible to reveal the software in its raw state, and therefore this scheme also cannot be considered as a completely reliable measure.

SUMMARY OF THE INVENTION

It is therefore an object of the present invention to provide a software analysis protection method capable of preventing an illegitimate use of a software reliably, by making a software analysis difficult without complicating or enciphering the software itself.

According to one aspect of the present invention there is provided a software analysis protection method for protecting a software to be used at a user terminal from being analyzed at the user terminal in a system formed by a center and a plurality of user terminals connected with the center, comprising the steps of: distributedly storing software parts dividing the software to be used at the user terminal in the user terminal and the center; requesting the software parts stored in the center from the user terminal at each time of a use of the software at the user terminal; transmitting the software parts stored in the center to the user terminal in response to a request from the user terminal and loading the software parts transmitted from the center into missing parts among the software parts stored in the user terminal on a memory so as to make the software operable at the user terminal while changing an arranged pattern of the software as developed on the memory at each time of a use of the software at the user terminal; and operating the software as developed on the memory at the user terminal.

According to another aspect of the present invention there is provided a software analysis protection method for protecting a software to be used at a user terminal from being analyzed at the user terminal in a system formed by a center and a plurality of user terminals connected with the center, comprising the steps of: distributedly storing software parts dividing the software to be used at the user terminal in the user terminal and the center; transmitting the software parts stored in the center to the user terminal and loading the software parts transmitted from the center into missing parts among the software parts stored in the user terminal on a memory so as to make the software operable at the user terminal; and operating the software as developed on the memory at the user terminal.

Other features and advantages of the present invention will become apparent from the following description taken in conjunction with the accompanying drawings.

DETAILED DESCRIPTION OF THE PREFERRED EMBODIMENTS

Now, one embodiment of the software analysis protection method according to the present invention will be described in detail.

In short, according to the software analysis protection method of the present invention, the software to be used on a user terminal is provided as divided parts (sub-softwares) which are distributedly stored in the user terminal and the center, and used by transmitting a part (sub-software) provided on the center to the user terminal at a time of a use of the software. Here, an arranged pattern of the software to be used at the user terminal on a memory is changed in each occasion to use the software, or a function of the software is changed by a request from a user or a judgment at the center, while each part (sub-software) of the software to be used at the user terminal that was transmitted from the center is sequentially cleared whenever it subsequently becomes unnecessary so as to minimize a chance for the software images to be developed on the memory simultaneously. In addition, all the parts (sub-softwares) that were transmitted from the center are made to be cleared by the time a use of the software at the user terminal is finished.

Figure 1:
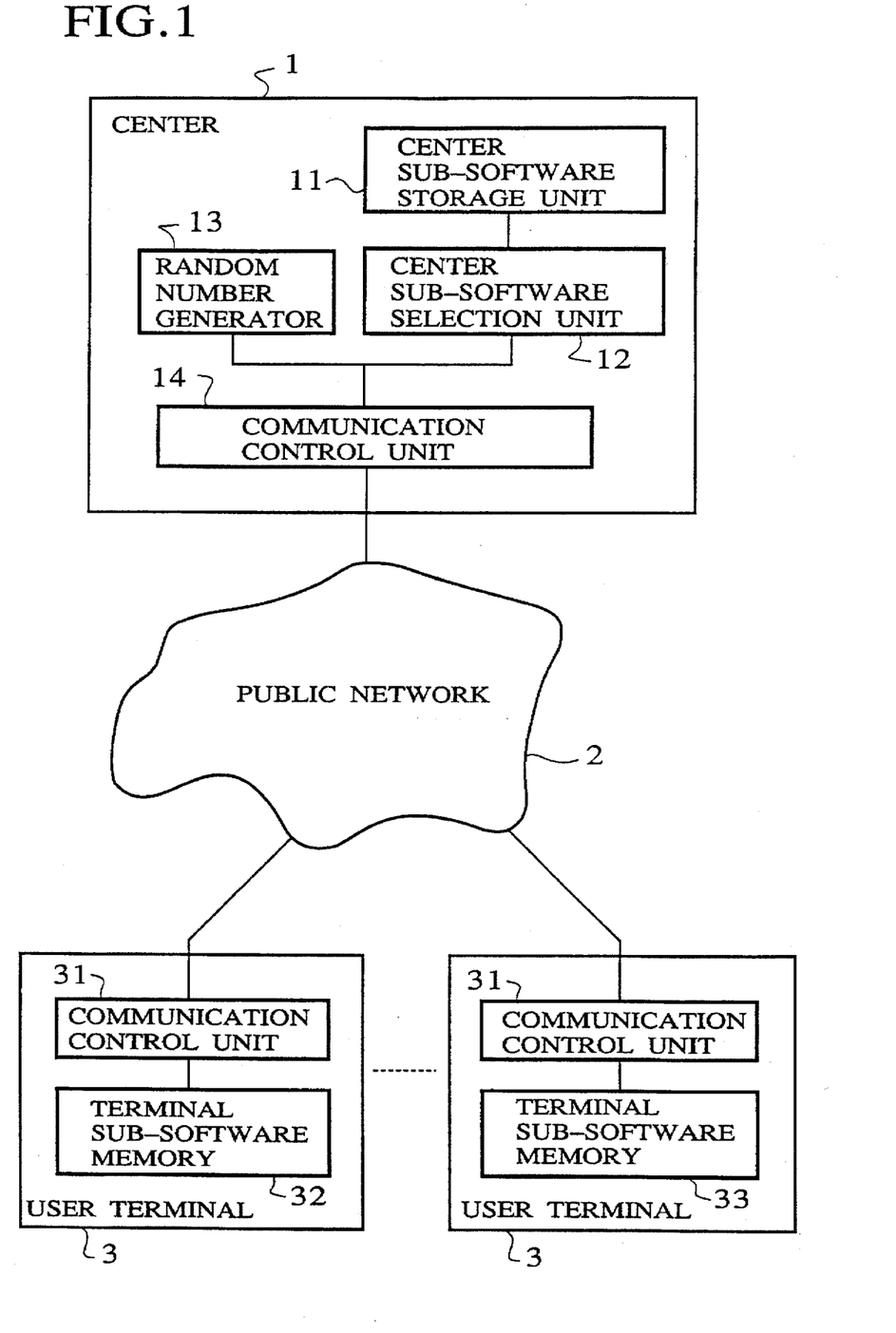
FIG. 1 is a schematic block diagram of a system to which one embodiment of the software analysis protection method according to the present invention is applied.

More specifically, the software analysis protection method of the present invention can be realized on a system as shown in FIG. 1, which comprises a center 1 and a plurality of user terminals 3 connected with the center 1 through a public network 2.

The software such as an application program to be used at each user terminal 3 is divided into parts (sub-softwares) and distributedly stored in the user terminal 3 and the center 1. In the following, the divided parts of the software to be used at the user terminal 3 which are stored in the center 1 will be referred as center sub-softwares, while the divided parts of the software to be used at the user terminal 3 which are stored in the user terminal 3 will be referred as terminal sub-softwares. Here, the center sub-softwares are software parts which complement the terminal sub-softwares.

In this embodiment, the software to be used at the user terminal 3 can be any kind of software except for a main portion of the protocol control software for controlling data transmission between the center 1 and the user terminal 3. For examine, it can be any of various types of application programs, a program at an operating system level other than a main portion of the data transmission control, and data of a database, etc.

In addition, the system formed by the center 1 and the user terminals 3 as shown in FIG. 1 to which the present invention is applicable may be in a form of a personal computer communication network system, or in a form of a system for delivering application software from the center 1 side to the user terminals 3. In particular, the present invention is suitable for a software distribution system in which an application software is delivered from the center 1 to each user terminal 3 whenever a need arise, while charging a fee for a use of the application software to each user.

As shown in FIG. 1, the center 1 includes a center sub-software storage unit 11 for storing center sub-softwares, a center sub-software selection unit 12 for selecting center sub-softwares stored in the center sub-software storage unit 11, a random number generator 13 for generating a random number, and a communication control unit 14 for controlling a communication with each user terminal 3 through the public network 2.

Also, as shown in FIG. 1, each user terminal 3 includes a communication control unit 31 for controlling a communication with the center 1 through the public network 2, and a terminal sub-software memory 32 for storing the terminal sub-softwares.

Figure 2:
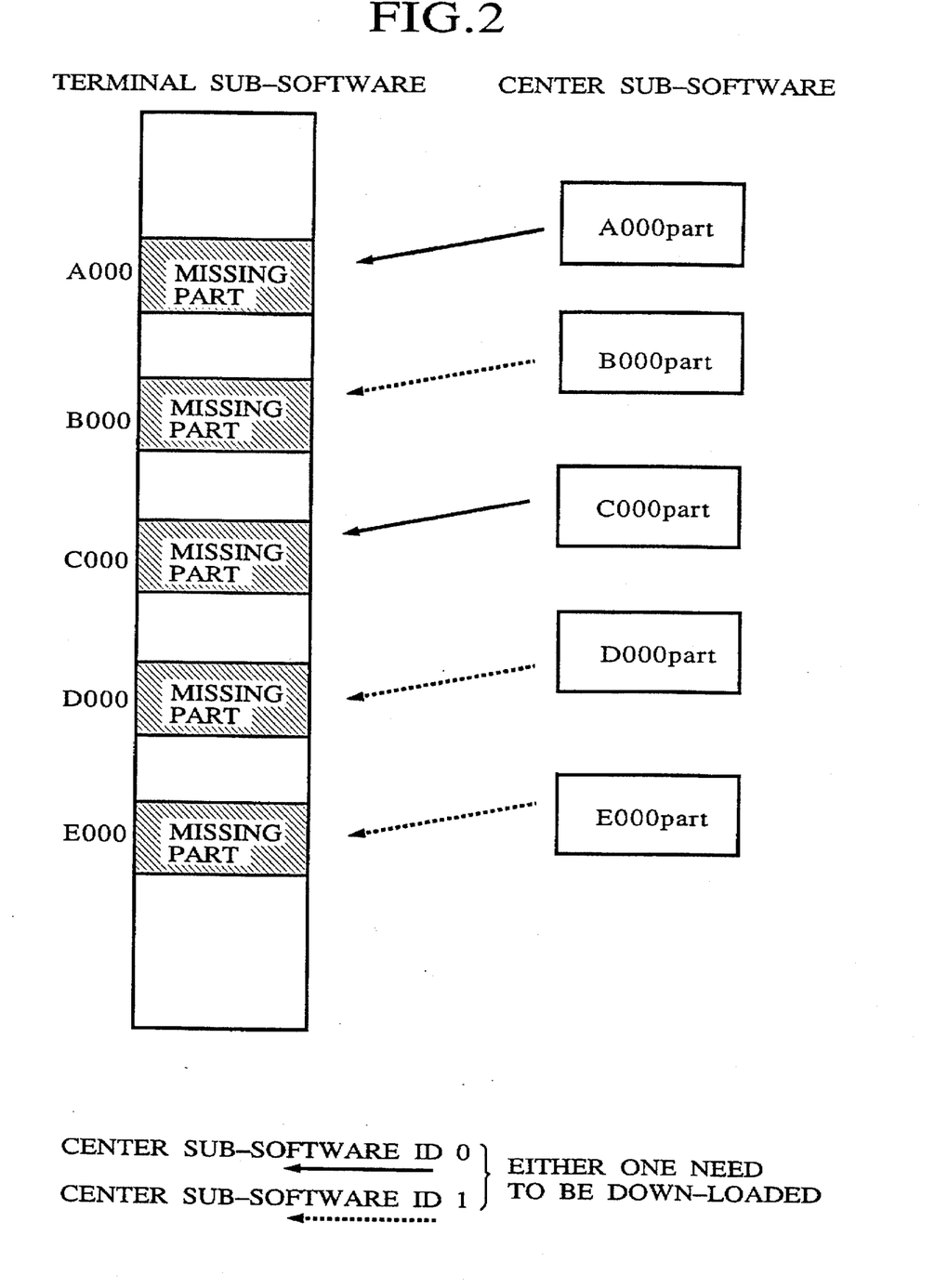
FIG. 2 is a diagram showing a relationship between terminal sub-softwares and center sub-softwares in one embodiment of the software analysis protection method according to the present invention.

In an initial state, the terminal sub-softwares are developed on the terminal sub-software memory 32 as a plurality of non-consecutive blocks with some missing parts at areas of prescribed sizes located among them, as indicated in FIG. 2, where shaded areas starting from addresses A000, B000, C000, D000, and E000 indicate the missing parts. As the terminal sub-softwares have missing parts, it is impossible to realize a normal operation of the application software even when the terminal sub-softwares alone are executed.

The terminal sub-softwares including the missing parts can be provided on the user terminal 3 by being distributed in a form of a floppy disk or CD-ROM and loaded into the user terminal 3 through a suitable drive device, or by being distributed by a file transfer from the center 1. It is also possible for the terminal sub-softwares to be stored in a hard disk device of the user terminal 3 in advance, and developed on a memory at a time of a system initialization or a software activation. Here, data concerning the addresses of the missing parts on the memory and the size of the area for each missing part are set up in advance in the center 1 side.

The software parts to be entered in to the missing parts of the terminal sub-softwares are stored in the center 1 as the center sub-softwares in forms of non-consecutive blocks, such that the application software becomes operable only when the center sub-softwares are loaded into the missing parts at the user terminal 3. Here, however, the application software may not necessarily require all the missing parts to be filled with the corresponding center sub-softwares in order to make it operable.

Namely, in a case of providing as many missing parts as a total number of center sub-softwares, it is possible to adopt a scheme for transferring all the center sub-softwares from the center 1 side collectively, but it is also possible to adopt a scheme in which the application software becomes at least partially operable when some specific missing parts are filled with the corresponding center sub-softwares while other missing parts remain empty.

For example, in a case the center sub-softwares contain a basic function software part and an expanded function software part of the application software, the application software can be made operable at the user terminal 3 by loading at least the basic function software part on the memory of the user terminal 3.

On the other hand, it is also possible to adopt a scheme in which the application software can be made operable at the user terminal 3 when a specific missing part or a specific set of missing parts are filled with the corresponding center sub-softwares.

For instance, in an example shown in FIG. 2, the application software is made operable either when a missing part starting from an address A000 and a missing part starting from an address C000 are filled with the center sub-softwares "A000part" and "C000part", or when a missing part starting from an address B000, a missing part starting from an address D000, and a missing part staring from an address E000 are filled with the center sub-softwares "B000part", "D000part", and "E000part". Here, a set of the center sub-softwares "A000part" and "C000part" and a set of the center sub-softwares "B000part", "D000part", and "E000part" may be functionally identical or different as long as each of these sets defines a functionally complete sub-software part which is implemented independently from the other parts of the application software.

The provision for using more than one functionally identical sets of the center sub-softwares may be adopted to change the software images developed on the memory in each occasion to use the application software, so as to reduce the risk for the application software to be analyzed by using memory images as clues.

In this case, which set of the center sub-softwares is to be down-loaded is determined at the center 1 side, by using a random number calculation at the center 1 side for example. In general, when there are N equivalent sets of the center sub-softwares, these equivalent sets can be assigned with unique IDs from "0" to "N-1" in advance, while at the center 1 side, a random number generated by the random number generator 13 is re-expressed by "mod N" residue calculation, and a set of the center sub-softwares having an ID corresponding to the calculated number is down-loaded.

In a case of using functionally different sets of the center sub-softwares, each set of the center sub-softwares is assigned with a unique ID in advance, and which set of the center sub-softwares for what kind of function is to be down-loaded is determined at the center 1 side, according to a request from the user side or a judgment at the center 1 side.

In this case, it is possible to adopt a scheme in which the basic function is down-loaded by the initial down-loading, and additional expanded functions are sequentially down-loaded as requested from the user terminal 3 side.

The provision for using more than one functionally different sets of the center sub-softwares may be adopted in order to achieve the software protection and the efficient use of software resources simultaneously for a number of applications which are similar but partially different from each other, by down-loading only mutually different part as the center sub-software for each of these applications.

In the following, the ID assigned to each set of the center sub-softwares will be referred as a center sub-software ID. This center sub-software ID is utilized by the communication control unit 31 of the user terminal 3 in recognizing which set of center sub-softwares has been down-loaded and determining positions of missing parts on the memory at which the down-loaded set is to be developed.

Now, a case of using more than one functionally equivalent sets of the center sub-softwares will be described in further detail. This is a case shown in FIG. 2 where the application software of the same function becomes operable either when the down-loading of the sets indicated by solid lines is made or when the down-loading of the sets indicated by dashed lines is made, as described above.

Here, which one of the sets of the center sub-softwares, i.e., a set of "A000part" and "C000part" or a set of "B000part", "D000part", and "E000part", is to be down-loaded is determined at the center 1 side, by using a random number calculation at the center 1 side for example. In this case, these sets are assigned with an ID "0" and ID "1", respectively, in advance, and "mod 2" residue calculation of a generated random number is carried out. Then, depending on the calculated number, the set of the center sub-softwares with the ID corresponding to the calculated number is selected and down-loaded to the corresponding missing parts.

In a state shown in FIG. 2, when the user terminal 3 starts the use of the application software, it is possible to adopt the following scheme for determining whether each missing part is an area loaded with the center sub-software or an area remaining as an empty area.

For example, at a time of the initial set up for storing the terminal sub-softwares in the memory of the user terminal 3, a code for returning a fixed value such as "0" is set up either at an entire area or at a specific fixed address such as a head address of each missing part. On the other hand, at a specific fixed address such as a head address or a tail address of each block of the center sub-software, a code for returning another fixed value such as "1" is set up in advance.

With these settings, when the center sub-softwares are transferred from the center 1 to the user terminal 3 and loaded into the missing parts, the contents of these missing parts are going to be rewritten by the loaded center sub-softwares. Then, at the terminal sub-software of the user terminal 3, data or a value returned from a fixed address within a storing area (at address A000 or C000, for instance) of the center sub-software is checked, and if it is a fixed value ("1" for instance) indicating that the center sub-software is loaded, the use of the software is continued, whereas if it is a fixed value ("0" for instance) indicating that it is a missing part, the user of the software is discontinued.

As an exemplary terminal sub-software structure, in a case each of the address A000 and the address B000 always returns either "0" or "1", the following can be used.

if A000="1" run from A000
if A000="0" go to B000
if B000="1" run from B000
if B000="0" end By using this setting, it is possible to interrupt the operation of the application software immediately whenever a part necessary for a normal operation is missing, without causing any abnormal operation in the system.

In addition, the terminal sub-software sequentially clears those center sub-softwares which are unnecessary for the subsequent operation, during the operation of the software.

For example, in an example shown in FIG. 2, when the center sub-softwares for the missing part starting from an address A000 and a missing part starting from an address C000 are down-loaded, as the use of the application software at the user terminal 3 starts, and the use of the center sub-software for the missing part starting from an address A000 is finished, the center sub-software for this missing part is cleared. In this manner, the application software is prevented from being developed on the memory in its entirety simultaneously as much as possible.

To this end, it is possible to use the center sub-software which has a property that a maximum number of times for its use can be known at each time of the use of the software, and which is provided with an area for counting a number of times of its use. Then, at a time of the use of the software, if the count reaches to a predetermined maximum number of times for its use, this center sub-software is cleared. In this manner, those center sub-softwares which are unnecessary for the subsequent operation can be sequentially cleared from the memory during the operation of the software.

Here, examples of a software part which has an above noted property that a maximum number of times for its use can be known at each time of the use of the software include the following.

(1) A part which is definitely not used for more than a certain number of times due to the software structure. For example, it can be a software initialization function part which is called up only once at the beginning of each execution of the software.

(2) A part which should not be used for more than a certain number of times in view of the copy right management requirement. For example, it can be a sub-software to be called up during the use of the software for which a fee is to be charged for a number of times of using dynamic images, still images, speeches, game programs, etc., or it can be a sample software for which a number of times for its use should be limited.

As a scheme for clearing the center sub-software at the user terminal 3, the following two schemes are possible.

Figure 3:
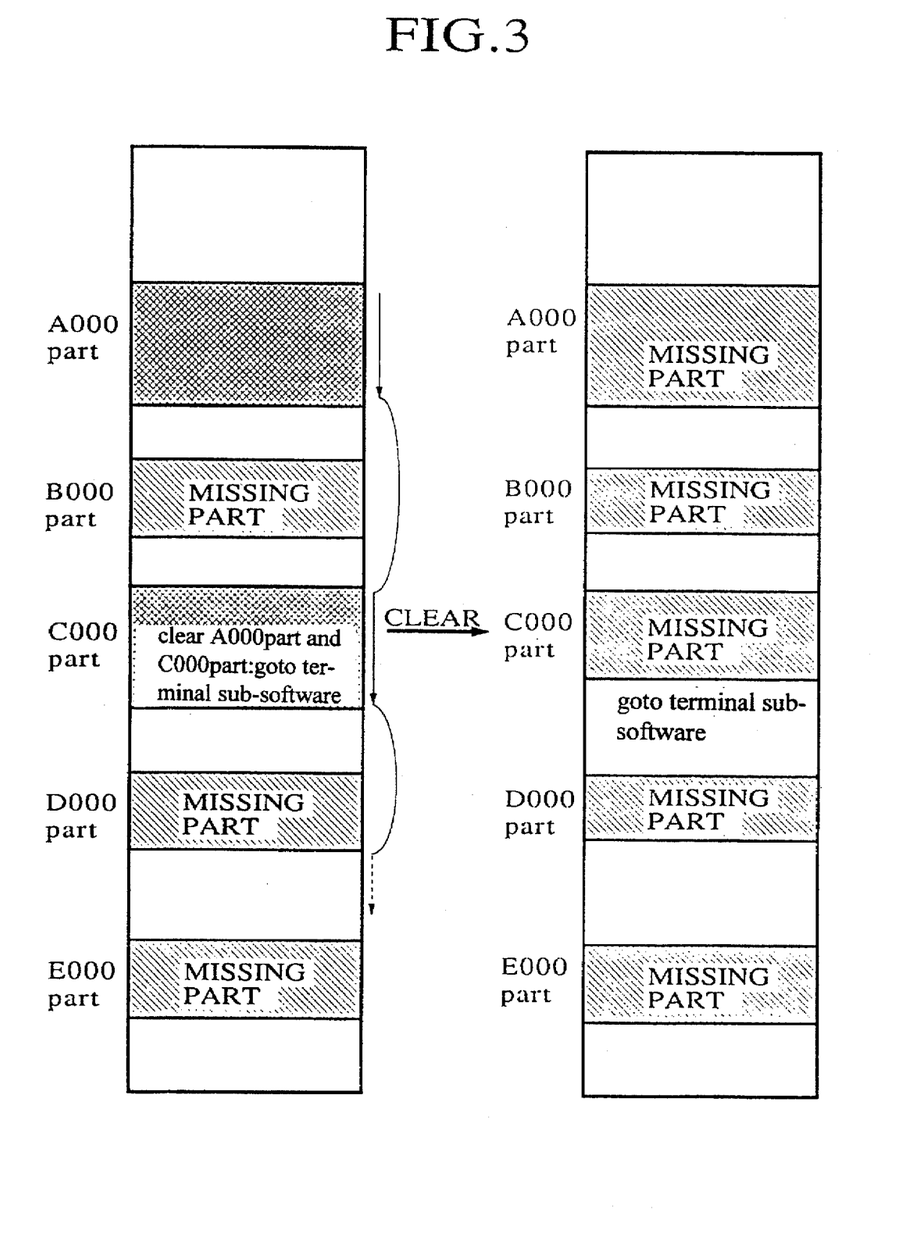
FIG. 3 is a diagram showing one exemplary manner for clearing center sub-softwares in one embodiment of the software analysis protection method according to the present invention.

One scheme is that in which the center sub-software clears itself as shown in FIG. 3. In this scheme, a command for clearing itself is written at next to the last line of the center sub-software, and a command for returning to the terminal sub-software is written at the last line of the center sub-software in this case, the last line of the center sub-software alone will remain uncleared.

Figure 4:
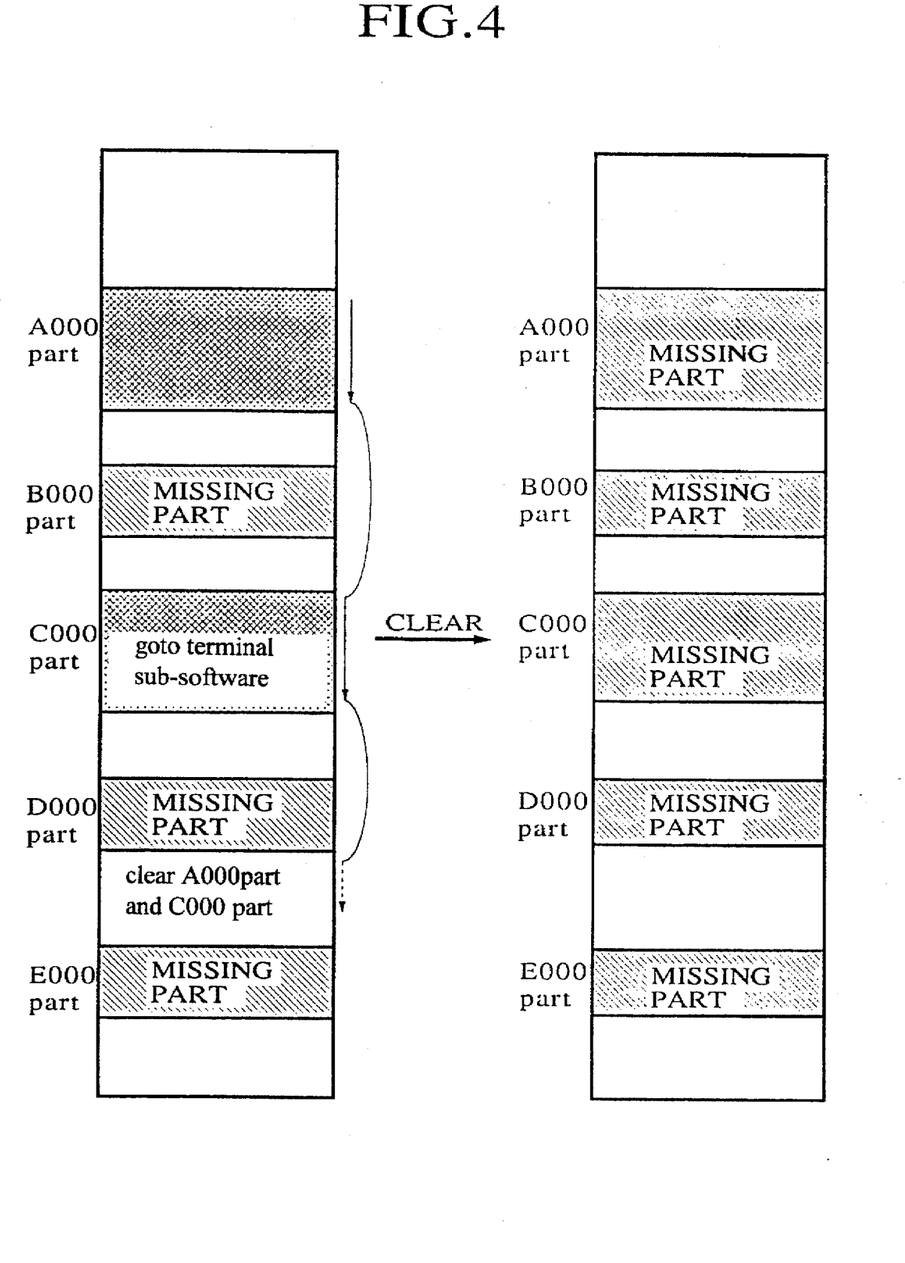
FIG. 4 is a diagram showing another exemplary manner for clearing center sub-softwares in one embodiment of the software analysis protection method according to the present invention.

Another scheme is that in which the terminal sub-software clears the center sub-software as shown in FIG. 4. In this scheme, a command for clearing appropriate center sub-softwares is written in the terminal sub-software to be executed after the execution of these center sub-softwares.

By the time at which the use of the software is finished in this manner, all the center sub-softwares that had been down-loaded from the center 1 to the user terminal 3 are cleared, and the memory of the user terminal 3 is initialized to a state before the down-loading of the center sub-software. Here, the initialization restores the missing parts to a state before the center sub-softwares are developed. For instance, this implies that a code for returning a fixed value such as "0" is set up again either at an entire area or at a specific fixed address such as a head address of each missing part.

Figure 5:
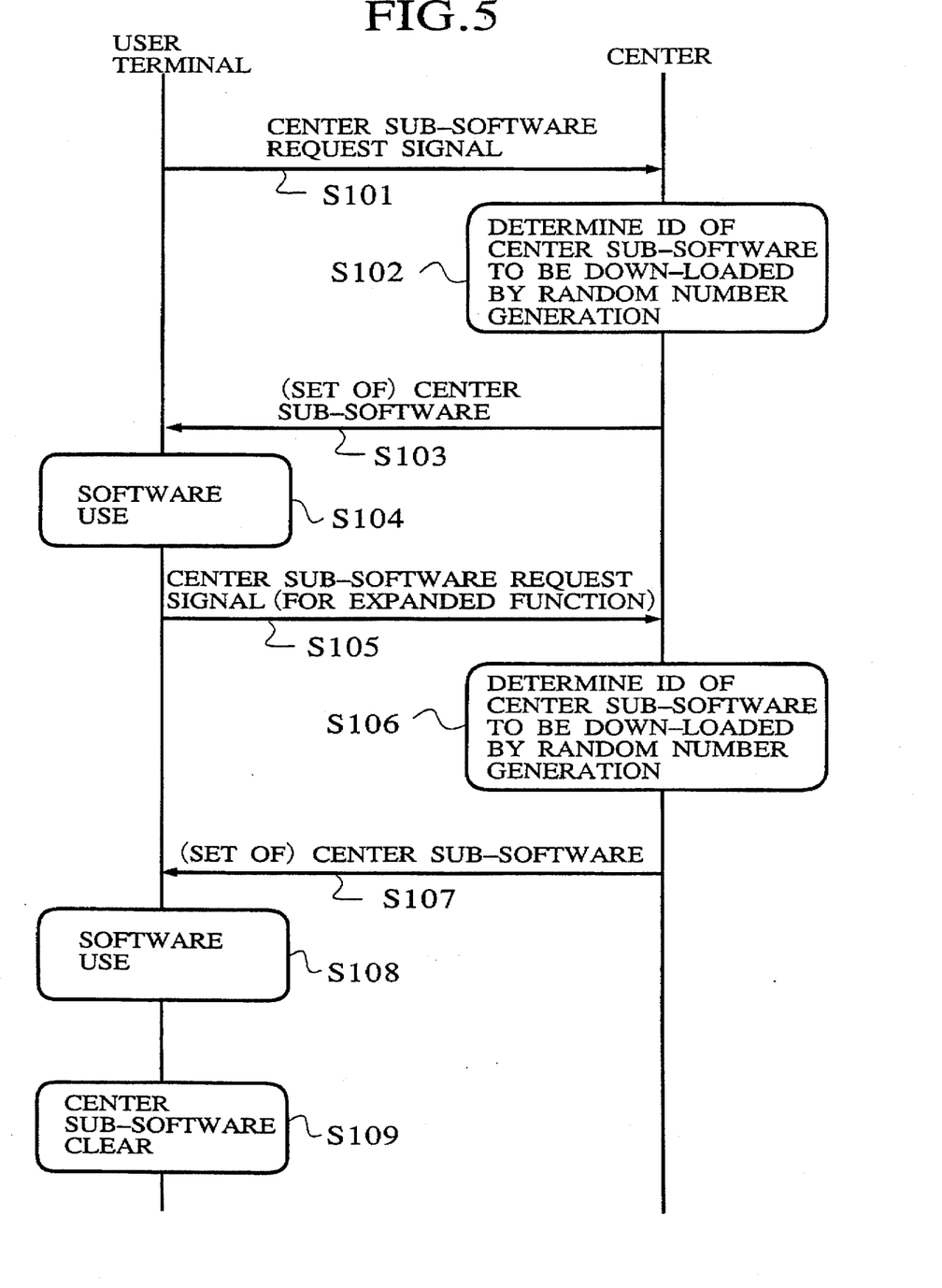
FIG. 5 is a sequence chart for an exemplary operation of the system of FIG. 1 as a whole.

Next, an exemplary operation of the system of FIG. 1 as a whole will be described with reference to a sequence chart of FIG. 5.

After the activation, the terminal sub-software is connected to the center 1 and transmits a "center sub-software request signal" to the center 1 (step S101). The center 1 which received this "center sub-software request signal" then generates a random number at the random number generator 13, and determines which set of the center sub-softwares are to be selected according to the generated random number at the center sub-software selection unit 12 (step S102). Then, the center 1 reads out the selected set of the center sub-softwares along with its memory development positions from the center sub-software storage unit 11, and down-loads the read out set of the center sub-softwares as a "center sub-software signal" to the user terminal 3 through the communication control unit 14 (step S103).

The communication control unit 31 of the user terminal 3 develops the set of the center sub-softwares transmitted from the center 1 on the memory according to the center sub-software ID, and the software is executed for use (step S104).

In a case another set of the center sub-softwares is necessary as an expanded function, the user terminal 3 transmits another "center sub-software request signal" to the center 1 (step S105), in response to which the center 1 carries out the determination of an appropriate set of the center sub-softwares (step S106) and the down-loading of the selected set of the center sub-softwares (S107) as in the above, and then the software is executed for use (step S108) at the user terminal 3.

In this process, those center sub-softwares which become unnecessary during the use of the software are sequentially cleared in a course of the operation of the software. Also, those center sub-softwares which are not yet cleared by the time the use of the software is finished are altogether cleared (step S109). Then, the missing parts from which the center sub-softwares are cleared are initialized as described above.

As described above, according to the software analysis protection method of the present invention, the software to be used on a user terminal is provided as divided parts (sub-softwares) on the user terminal and the center, and the software parts originally provided on the user terminal are not operable by themselves, so that it is impossible to learn the entire structure of the application software by just analyzing the software parts originally provided on the user terminal side.

Also, at a time of operating the application software at the user terminal, it is necessary to connect the user terminal with the center through a transmission line and couples the software parts originally provided on the center with the software parts originally provided on the user terminal by down-loading them into missing parts on the user terminal side. Here, the software parts to be down-loaded are made to be changed at each occasion to use of the software, an arranged pattern of the coupled software to be used at the user terminal on a memory is made to be changed in each occasion to use the software, and the down-loaded software parts which are unnecessary for the subsequent operation are made to be sequentially cleared, so that the software analysis is made to be quite prohibitive. Consequently, according to the software analysis protection method of the present invention, it is possible to prevent an illegitimate use of a software reliably, by making a software analysis difficult without complicating or enciphering the software itself.

It is to be noted that many modifications and variations of the above embodiments may be made without departing from the novel and advantageous features of the present invention. Accordingly, all such modifications and variations are intended to be included within the scope of the appended claims.

What is claimed is:

1. A software analysis protection method for protecting a software to be used at a user terminal from being analyzed at the user terminal in a system formed by a center and a plurality of user terminals connected with the center, comprising the steps of:

distributedly storing software parts dividing the software to be used at the user terminal in the user terminal and the center;

requesting the software parts stored in the center from the user terminal at each time of a use of the software at the user terminal;

transmitting the software parts stored in the center to the user terminal in response to a request from the user terminal and loading the software parts transmitted from the center into missing parts among the software parts stored in the user terminal on a memory so as to make the software operable at the user terminal while changing an arranged pattern of the software as developed on the memory at each time of a use of the software at the user terminal; and operating the software as developed on the memory at the user terminals;

wherein the software parts stores in the center include a plurality of sets of software parts with an identical function, and the center selects one set of software parts for a transmission from the center to the user terminal according to a random number, such that the arranged pattern of the software as developed on the memory is changed at each time of a use of the software at the user terminal.

2. The software analysis protection method of claim 1, wherein the software parts stored in the center include more than one group of software parts for different functions of the software including a plurality of sets of software parts for each function of the software, and the center selects one set of software parts in one group of software parts for a transmission from the center to the user terminal according to one of the request from the user terminal or a judgment at the center, such that a function of the software operated at the user terminal is changed.

3. The software analysis protection method of claim 1, wherein the software parts stored in the center include a plurality of sets of software parts, the center selects one set of software parts for a transmission from the center to the user terminal, and the software becomes at least partially operable when said one set of software parts transmitted from the center are loaded into a corresponding set of the missing parts on the memory.

4. The software analysis protection method of claim 3, wherein the center sequentially transmits said plurality of sets of software parts in response to requests from the user terminal as an operation of the software progresses.

5. The software analysis protection method of claim 1, wherein the software parts loaded into the missing parts are cleared from the memory after a use of the software at the user terminal is finished.

6. The software analysis protection method of claim 1, wherein the software parts loaded into the missing parts are sequentially cleared from the memory during an operation of the software, as the software parts loaded into the missing parts become unnecessary for subsequent operation of the software.

7. The software analysis protection method of claim 1, wherein the software parts loaded into the missing parts are cleared from the memory by a command provided in the software parts stored in the user terminal.

8. The software analysis protection method of claim 1, wherein the software parts loaded into the missing parts are cleared from the memory by a command provided in the software parts stored in the center and loaded into the missing parts.

9. The software analysis protection method of claim 1, wherein each software part stored in the center has a known maximum number of times for use of said each software part and a count of number of times for actual use of said each software part, and said each software part which is loaded into the missing part is cleared from the memory whenever said count of number of times for actual use of said each software part reaches to said maximum number of times for use of said each software part.

10. The software analysis protection method of claim 1, wherein the software parts stored in the user terminal are a plurality of non-consecutive blocks in the software.

11. The software analysis protection method of claim 1, wherein the software parts stored in the center are a plurality of non-consecutive blocks in the software, and the non-consecutive blocks of the software parts stored in the center are transmitted in an non-sequential order among the non-consecutive blocks.

12. The software analysis protection method of claim 1, wherein each software part stored in the center has a first code at a prescribed address within said each software part, the first code having a function for returning a fixed value indicating that it is a software part stored in the center when said each software part is checked at the user terminal, each missing part on the memory in the user terminal has a second code at a prescribed address within said each missing part, the second code having a function for returning another fixed value indicating that it is a missing part when said each missing part is checked at the user, and the method further comprises the steps of:

checking a value returned from the first code or the second code provided in each part of the software as developed on the memory while operating the software at the user terminal, so as to judge whether each part of the software is a software part loaded into a missing part or a remaining missing part; and interrupting an operation of the software whenever said another fixed value is returned from one part of the software as developed on the memory in a course of operating the software at the user terminal.

13. A software analysis protection method for protecting a software to be used at a user terminal from being analyzed at the user terminal in a system formed by a center and a plurality of user terminals connected with the center, comprising the steps of:

distributedly storing software parts dividing the software to be used at the user terminal in the user terminal and the center;

transmitting the software parts stored in the center to the user terminal and loading the software parts transmitted from the center into missing parts among the software parts stored in the user terminal on a memory so as to make the software operable at the user terminal; and operating the software as developed on the memory at the user terminal;

wherein the software parts stored in the center include a plurality of sets of software parts with an identical function, and the center selects one set of software parts for a transmission from the center to the user terminal according to a random number, such that an arranged pattern of the software as developed on the memory is changed at each time of a use of the software at the user terminal.

14. The software analysis protection method of claim 13, wherein the software parts stored in the center are transmitted to the user terminal in response to a request from the user terminal at each time of a use of the software at the user terminal.

15. The software analysis protection method of claim 13, wherein the software parts stored in the center are transmitted as a plurality of blocks in the software.

16. The software analysis protection method of claim 13, wherein an arranged pattern of the software as developed on the memory is changed at each time of a use of the software at the user terminal.

17. The software analysis protection method of claim 13, wherein the software parts stored in the center include a plurality of sets of software parts, the center selects one set of software parts for a transmission from the center to the user terminal, and the software becomes at least partially operable when said one set of software parts transmitted from the center are loaded into a corresponding set of the missing parts on the memory.

18. The software analysis protection method of claim 13, wherein the software parts loaded into the missing parts are cleared from the memory after a use of the software at the user terminal is finished.

19. The software analysis protection method of claim 13, wherein the software parts loaded into the missing parts are sequentially cleared from the memory during an operation of the software, as the software parts loaded into the missing parts become unnecessary for subsequent operation of the software.

* * * * *